US011356546B2

(12) United States Patent
Goel et al.

(10) Patent No.: US 11,356,546 B2
(45) Date of Patent: Jun. 7, 2022

(54) SMART SYSTEM AND METHOD FOR PROVIDING INCREASED AVAILABILITY OF CONTENT IN AN OFFLINE MODE USING BOTS

(71) Applicant: FMR LLC, Boston, MA (US)

(72) Inventors: Nilesh Goel, Kolkata (IN); Samir Kakkar, Bengaluru (IN); Meenakshi Ashokkumar, Bengaluru (IN); Dhiman Dasgupta, Bengaluru (IN); Ranjith Prabhu, Udupi (IN)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 16/717,945

(22) Filed: Dec. 17, 2019

(65) Prior Publication Data

US 2021/0185166 A1    Jun. 17, 2021

(51) Int. Cl.
| | |
|---|---|
| *H04W 68/02* | (2009.01) |
| *H04L 41/147* | (2022.01) |
| *H04W 4/029* | (2018.01) |
| *H04M 1/724* | (2021.01) |
| *H04M 1/72406* | (2021.01) |

(52) U.S. Cl.
CPC ...... *H04M 1/72406* (2021.01); *H04L 41/147* (2013.01); *H04W 4/029* (2018.02); *H04W 68/02* (2013.01)

(58) Field of Classification Search
CPC .............. H04W 4/029; H04W 68/202; H04M 1/72525; H04L 41/147
See application file for complete search history.

(56) References Cited

U.S. PATENT DOCUMENTS

| | | | |
|---|---|---|---|
| 10,768,977 B1* | 9/2020 | Paul .................... | G06F 11/3476 |
| 2011/0167128 A1* | 7/2011 | Raghunathan ........ | H04W 36/02 |
| | | | 709/217 |
| 2014/0095943 A1 | 4/2014 | Kohlenberg et al. | |
| 2016/0057639 A1* | 2/2016 | Smith ................... | H04W 4/029 |
| | | | 455/423 |
| 2016/0099963 A1* | 4/2016 | Mahaffey ............ | H04L 63/0227 |
| | | | 726/25 |
| 2017/0126833 A1 | 5/2017 | DeLuca et al. | |
| 2018/0035259 A1 | 2/2018 | Castelli et al. | |
| 2018/0121808 A1* | 5/2018 | Ramakrishna .......... | H04L 51/02 |
| 2019/0034828 A1* | 1/2019 | Cagadas ................ | G06N 20/00 |

* cited by examiner

*Primary Examiner* — Muthuswamy G Manoharan
(74) *Attorney, Agent, or Firm* — Proskauer Rose LLP (57) ABSTRACT

Systems and methods are described for automating retrieval of application data prior to wireless network outages and rendering mobile device UIs during the outages. The system includes a server and database of data object files corresponding to features of applications executable on the mobile device. The mobile device receives a notification from the server before a predicted network outage, and sends back a request including parameters indicating resource status. The mobile device receives a response including a data object file from the database and automatically invokes a network bot, UI bot, and navigation bot. The network bot retrieves application data from a web server based on an object from the data object file. The navigation bot generates a navigation handle based on an object from the data object file, and the UI bot renders a UI based upon a UI object from the data object file and the navigation handle.

12 Claims, 3 Drawing Sheets

205 Receive a push notification a period of time before a predicted network outage experienced by the mobile computing device 210 Send a data object file request comprising parameters indicating a status of resources of the mobile computing device.

215 Receive a response including a data object file retrieved from the computer data store.

220 Automatically invoke a network bot, a user interface bot, and a navigation bot upon receipt of the data object file.

225 Retrieve application data from a web server based upon a network object extracted from the data object file 230 Generate a navigation handle corresponding to a utilized feature of an application executing on the mobile computing device during a network outage, wherein the navigation handle is based upon a navigation object extracted from the data object file 235 Render an application user interface based upon a user interface object extracted from the data object file and the navigation handle.

SMART SYSTEM AND METHOD FOR PROVIDING INCREASED AVAILABILITY OF CONTENT IN AN OFFLINE MODE USING BOTS

TECHNICAL FIELD

This application relates to systems and methods for providing smart offline content using bots, and in particular, to smart systems and methods using bots for providing increased availability of content to a mobile computing device application in an offline mode.

BACKGROUND

Software applications or "apps" for smartphones and other mobile-enabled devices are often heavily reliant on content that is retrieved from remote servers over a wireless communications network (e.g., cellular, Wi-Fi, etc.). For example, a newsreader application may initially retrieve content comprising the latest headlines and present them to the user on the smartphone display as clickable links on the application's user interface. The newsreader application may subsequently retrieve additional content comprising the text and any corresponding multimedia content (e.g., photos, cartoons, videos, etc.) related to a particular news story the user selects by tapping or clicking the associated link. Accordingly, newsreaders and other content-consuming applications must continually retrieve additional content in order to remain executing and provide the most satisfying user experience.

However, the coverage of wireless communications networks is far from ubiquitous, and even networks built out with the most extensive infrastructure will nonetheless include network dead spots or dead zones. Dead zones are geographic areas in which a smartphone's connection to a wireless network is either completely absent, or degraded to such a degree that content cannot be retrieved over the network. The existence and size of a dead zone can be influenced by the distance between a carrier's signal towers, natural and man-made physical barriers between a smartphone and a tower (e.g., dense/tall trees, hills/valleys, tunnels, and building materials such as concrete, brick, steel, etc.), and atmospheric conditions (e.g., fog, storm clouds, etc.).

In many cases, users regularly experience the same dead zone(s) while commuting in automobiles, via subways or commuter trains, or during travel by plane. In the U.S., it is estimated that 15% of smartphone and mobile device users are using applications in an offline mode at any given point of time. However, many applications provide only limited useable features when offline, and most applications do not support an offline mode at all and simply go into an endless loop of attempting to download content, or timing out after one or more download attempts and subsequently freezing. At best, the application displays limited static content after providing the user with an alert indicating that the application has gone offline due to a lost or insufficient network connection. These types of behaviors by current smartphone and mobile device applications frustrate users and severely hamper the user experience.

SUMMARY

There is therefore a need for effective systems and methods for providing increased availability of content to a mobile computing device application in an offline mode. In one aspect, the technology features system for automating retrieval of application data prior to a network outage and rendering a user interface on a mobile computing device experiencing a network outage. The system includes a computer data store including a corpus of data object files. The data object files include a plurality of data objects corresponding to features of one or more applications executable on the mobile computing device. The system includes a server computing device in communication with the computer data store. The system includes a mobile computing device in communication with the server computing device via a wireless network. The mobile computing device has a memory for storing computer-executable instructions and a processor that executes the computer-executable instructions. Execution of the computer-executable instructions on the processor causes the mobile computing device to receive, from the server computing device, a push notification a period of time before a predicted network outage experienced by the mobile computing device. Execution of the computer-executable instructions on the processor causes the mobile computing device to send, to the server computing device, a data object file request including parameters indicating a status of resources of the mobile computing device. Execution of the computer-executable instructions on the processor causes the mobile computing device to receive, from the server computing device, a response including a data object file retrieved from the computer data store. Execution of the computer-executable instructions on the processor causes the mobile computing device to automatically invoke, on the mobile computing device, a network bot, a user interface bot, and a navigation bot upon receipt of the data object file. Execution of the computer-executable instructions on the processor causes the mobile computing device to retrieve, by the network bot, application data from a web server based upon a network object extracted from the data object file. Execution of the computer-executable instructions on the processor causes the mobile computing device to generate, by the navigation bot, a navigation handle corresponding to a utilized feature of an application executing on the mobile computing device during a network outage. The navigation handle is based upon a navigation object extracted from the data object file. Execution of the computer-executable instructions on the processor causes the mobile computing device to render, by the user interface bot, an application user interface based upon a user interface object extracted from the data object file and the navigation handle.

The above aspect can include one or more of the following features. In some embodiments, the data object file request comprises parameters indicating a charge level of a battery of the mobile computing device and an amount of free space remaining in a data storage component of the mobile computing device. In some embodiments, the number of data objects in the data object file is based on the parameters indicating the status of resources of the mobile computing device.

In some embodiments, the period of time before the predicted network outage experienced by the mobile computing device is based on a first duration of time required for the network bot to retrieve the application data from the web server and a second duration of time required to render the application user interface.

In some embodiments, the period of time before the predicted network outage is based on historical application usage data captured during a previous network outage experienced by the mobile computing device. In some embodiments, the historical application usage data comprises one or more of a date, a time of day, and data indicating a geographic location of the mobile computing device. In some embodiments, the historical application usage data comprises one or more of an application type, and application name, and a feature of an application being utilized at the time of a network outage.

In some embodiments, the data object file included in the response from the server computing device depends on one or more of a date, a time of day, and data indicating a geographic location of the mobile computing device. In some embodiments, the data object file included in the response from the server computing device is further based on a predictive algorithm for determining a feature of an application that will be used during a network outage experienced by the mobile computing device.

In some embodiments, the network bot retrieves a subset of the application data based on one or more of a charge level of a battery of the mobile computing device, an amount of free space remaining in a data storage component of the mobile computing device, and the duration of the period of time before the predicted network outage experienced by the mobile computing device.

BRIEF DESCRIPTION OF THE DRAWINGS

The advantages of the systems and methods described herein, together with further advantages, may be better understood by referring to the following description taken in conjunction with the accompanying drawings. The drawings are not necessarily to scale, emphasis instead generally being placed upon illustrating the principles of the described embodiments by way of example only.

DETAILED DESCRIPTION

One of the most fundamental differences between applications executing on a mobile device and traditional websites served from a host device is that mobile applications have the ability to continue operating when in an offline mode without a network connection. While there are certain scenarios and functions for which an active network connection is required in order for mobile applications to complete critical tasks such as bill payments, there are other important features that can still be taken advantage of using the smart off-lining features of the technology described herein. The technology provides a new way to tackle network connectivity issues using intelligence to ensure that a seamless user experience is provided to the mobile device user. In particular, software bots are created that each have discrete responsibilities and manage the lifecycle of other bots to create a running application. A master bot manages the lifecycle of one or more other slave bots.

Figure 1:
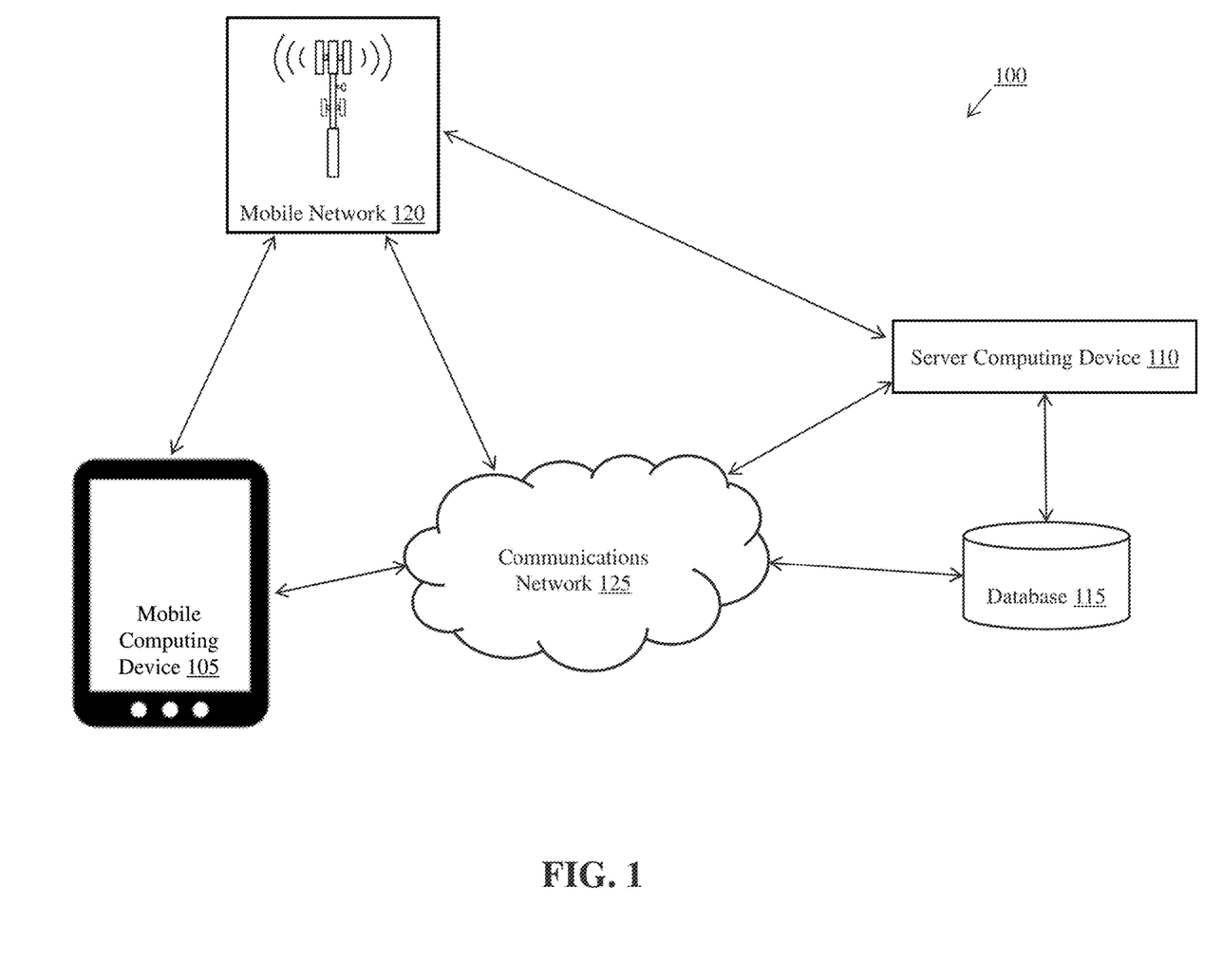
FIG. 1 is a block diagram of a computing environment for automating retrieval of application data prior to a network outage and rendering a user interface on a mobile computing device experiencing a network outage, according to embodiments of the technology described herein.

FIG. 1 is a block diagram of an exemplary computing environment 100 in accordance with embodiments of the technology described herein. Computing environment 100 includes mobile computing device 105, server computing device 110 (hereinafter "server 110"), database 115, mobile network 120, and communications network 125. Although only single instances of server 110 and database 115 are shown, it should be understood that each can represent a plurality of devices and databases, and can support connections to a variety of communications media types and protocols.

Examples of mobile computing device 105 include tablet computers, smartphones, and other mobile computing devices known in the art capable of executing applications and communicating via a wireless network. In some embodiments, mobile computing device 105 is a laptop computer.

Server 110 is a computing device (or in some embodiments, a set or cluster of computing devices) that comprises a combination of hardware, including one or more processors and one or more physical memory modules, and specialized software engines and models that execute on the processor of server 110, to receive data from other components shown in computing environment 100, transmit data to other components of computing environment 100, and perform the functions described herein. In some embodiments, server 110 includes one or more of a cluster of server computing devices, a server computing device employing massively parallel computing algorithms, and a server computing device employing a plurality of processors.

In some embodiments, server 110 includes specialized sets of computer software instructions programmed onto a dedicated processor in the server 110 and can include specifically-designated memory locations and/or registers for executing the specialized computer software instructions.

Database 115 is a computing device (or in some embodiments, a set of computing devices) that is in communication with server 110 and optionally also communications network 125. Database 115 is configured to receive, generate, and store specific segments of data relating to the operations described herein. For example, database 115 can manage and store content requested by an application executing on mobile computing device 105 via server 110, such as data that is used to populate UIs for web-hosted tools. In some embodiments, all or a portion of the database 115 can be integrated with the server 110 or be located on a separate computing device or devices. For example, the database 115 can comprise one or more databases, such as MySQL™ available from Oracle Corp. of Redwood City, Calif. In some embodiments, database 115 is a network storage system or cloud-based storage platform.

In some embodiments, the functionality of server 110 and database 115 can be distributed among a plurality of server computing devices located at multiple physical locations. In some embodiments, server 110 is a web server that stores, processes and delivers web pages to client devices (e.g., mobile computing device 105) via a network (e.g., mobile network 120, communications network 125). In some embodiments, the source data and files for the web pages is stored on database 115. In some embodiments, server 110 that stores, processes and delivers data to applications executing on client devices via a network (e.g., mobile network 120, communications network 125). In some embodiments, database 115 stores a corpus or plurality of formatted files (e.g., data object files) including information and properties related to objects (e.g., variables, functions, data structures, functions, methods, metadata etc.) and data values utilized by applications executing on mobile computing device 105. In some embodiments, database 115 stores a plurality of files formatted according to the JavaScript Object Notation ("JSON") format standard.

Mobile Network 120 can be any mobile or cellular network that communicates to client devices via a wireless link. In some embodiments, mobile network 120 includes a plurality of wireless transceivers (e.g. cell sites, cellular towers, cellular base stations, etc.) throughout a geographic area. In some embodiments, mobile network 120 is a wireless broadband network providing wireless internet access to client devices via cellular towers. In some embodiments, mobile network 120 can include components to connect to either of a wired network or a wireless network type such as Wi-Fi, in order to access a wider network, such as the Internet.

Communications network 125 can be a local network, such as a LAN, or a wide area network ("WAN"), such as the Internet and/or a cellular network. Communications network 125 can further comprise components of both a LAN and a WAN, or any other type of network known in the art. Communications network 125 facilitates communications between the various components of computing environment 100, which can include network-interface components to enable connectivity to communications network 125 via multiple mediums and network types. For example, the network-interface components can include components to connect to either of a wired network or a wireless network, such as a Wi-Fi or cellular network (e.g., mobile network 120), in order to access a wider network, such as the Internet.

As shown in FIG. 1, the components of computing environment 100 can include connections to multiple network types, and different network components can likewise be interconnected. It should be appreciated that any number of computing devices, arranged in a variety of architectures, resources, and configurations (e.g., cluster computing, virtual computing, cloud computing) can be used without departing from the scope of the invention. The exemplary functionality of the technology is described in detail below.

Utilizing components of computing environment 100, the technology described herein implements a "smart offline" cognitive platform based on the algorithmic creation of task-specific bots for automating retrieval of application data prior to a network outage and rendering a user interface on a mobile computing device that is experiencing a network outage. The technology leverages a learning subsystem which records data about user interactions with applications executing on mobile computing device 105 along with metrics and parameters relating to the status of mobile computing device 105 and the corresponding operating conditions. Analytics are used to identify patterns in the recorded data, in particular around the time mobile computing device 105 goes offline. Once identified, these patterns are used to determine the timing for invoking automated bots which handle tasks such as making network calls, creating and rendering UI components, and setting navigation in place, thereby ensuring the availability of the data needed for continued use of an application in the offline mode before the network connection drops.

Figure 2:
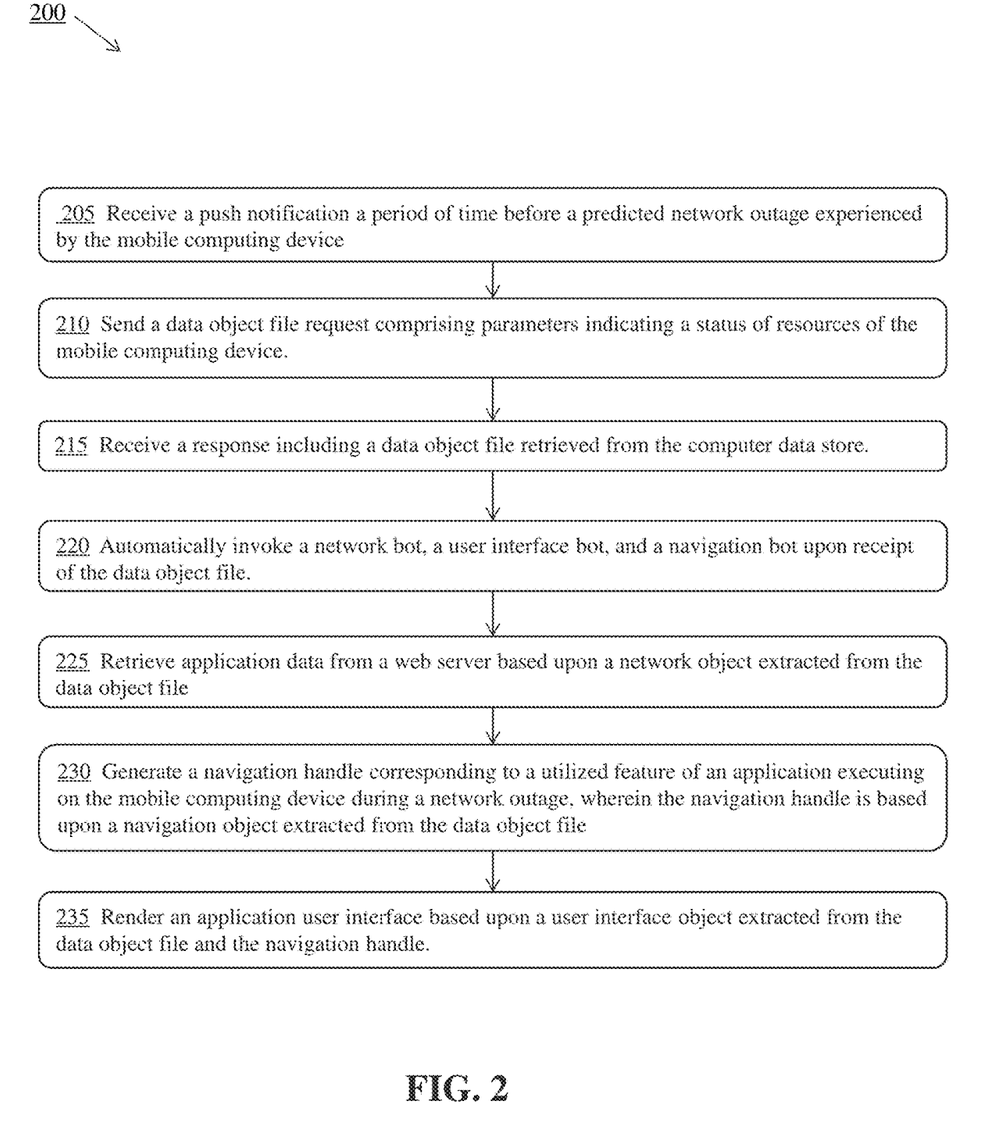
FIG. 2 a flow diagram of a computer-implemented method for automating retrieval of application data prior to a network outage and rendering a user interface on a mobile computing device experiencing a network outage, according to embodiments of the technology described herein.

Exemplary features of the technology described herein are further illustrated with reference to FIG. 2 which is a flow diagram of a computer-implemented method 200 for automating retrieval of application data prior to a network outage and rendering a user interface on a mobile computing device experiencing a network outage. Method 200 can be carried out by and between the various components of environment 100.

A mobile computing device (e.g., mobile computing device 105) can receive (205) a push notification from a server computing device (e.g., server 110) a period of time before a predicted network outage experienced by the mobile computing device. Based on patterns identified (e.g., by the learning subsystem of the described technology) using analytics run on data recorded around the time a particular mobile computing device 105 goes offline, as noted above, a period of time or "safe seconds" can be established. In some embodiments, safe seconds is a predicted duration of time before a mobile computing device goes offline. In some embodiments, safe seconds is rounded to the nearest second. In some embodiments, the number of safe seconds is dependent, in part, on a location of the mobile computing device 105 and a speed and/or direction it is moving in.

A connection manager module for the particular technology being utilized is used to determine the status of the mobile computing device 105's network connection. Accordingly, once mobile computing device 105 goes into an offline mode, the aforementioned parameters and data (e.g. date, timestamp, location, etc.) are stored locally on mobile computing device 105. During the offline period, the technology described herein continuously polls to check when the network is operational and the connection is stable again. Once this has been achieved, an API is called to register the stored parameters and data to the learning subsystem.

During the training phase in which the learning subsystem is gathering data to later be able to predict the safe seconds required for certain offline features and applications, parameters and data about the mobile computing device 105 is gathered and stored upon going offline. In some embodiments, data such as the date and time the mobile computing device 105 went offline are gathered and stored. In some embodiments, the learning subsystem gathers data about the location of mobile computing device 105 and the application that was being executed as the mobile computing device 105 goes offline. In some embodiments, the learning subsystem gathers data related to application type, application name, and any features of applications being utilized at the time of a network outage. In some embodiments, analytics are used to determine the most used features of the application being used when mobile computing device 105 goes offline. In some embodiments, the most used features of the application are determined based on number of clicks and time spent on a particular screen or activity while using the application.

On the basis of the data gathered above, a pattern of the application's behavior and requirements when off-lining can be determined. Further, the most used features and the corresponding apps they are used on for a particular user can be determined. Even after initially determining patterns, determination of the most used feature in an app for a particular user and the expected offline duration can always happen in the background through a continuous polling process. In some embodiments, it is the polling process that initiates the bots during the safe seconds to keep the data objects and packages ready with the necessary service call and UI rendering.

The concept of "safe seconds" is determined based on the amount of time it takes for the mobile computing device 105 to reestablish a stable network connection after going offline, summed together with the amount of time needed for the service call to gather UI data and the time needed to render the UI. For example, the safe seconds calculation can include a first duration of time required for a network bot to retrieve application data from a web server and a second duration of time required for a UI bot to render the application's user interface. Further, the safe seconds calculation includes the duration of the time it takes to initialize the bot framework process through a JSON object that is generally created for the most used features of an application to be used in an offline mode.

Accordingly, the number of safe seconds can vary depending on the particular feature that is being sought to be used in an offline mode, and the requirements of different mobile computing devices. In essence, during the safe seconds, the bots of the technology are triggered which make the network calls, create the UI components and set the navigation in place, such that when the user opens the app on mobile computing device 105 in the offline mode, the data needed to support the features the user wishes to use when offline has all been fetched before the network outage occurs.

The following pseudo code illustrates exemplary computing operations for determining the number of safe seconds for a particular application:

```
Var ServiceStartTime=System.nanoTime( )

AccountSeriveNetworkCall( );

Var serviceEndTime=System.nanoTime( );

Var UIRenderingStartTime=System.nanoTime( );

AccountListUIRender( );

Var UIRenderingEndTime=System.nanoTime( );

var ServiceCallTime=serviceEndTime–ServiceStart-
    Time;

var UIRenderingTime=UIRenderingEndTime–
    UIRenderingStartTime var totalTime=ServiceCallTime+UIRenderingTime;

var safeSeconds=offlineTime–TotalTime;
```

Returning to method 200, mobile computing device 105 can send (210), to the server computing device, a data object file request comprising parameters indicating a status of resources of the mobile computing device. For example, within the safe seconds time period, mobile computing device 105 can send a request for a JSON object, including the parameters and data discussed above, to server computing device 110.

In some embodiments, the JSON object includes parameters indicating a charge level of mobile computing device 105's battery. In some embodiments, the JSON object includes parameters indicating the amount of free space remaining in a data storage component (e.g., volatile or non-volatile storage) of the mobile computing device. In some embodiments, the number of data objects in a given JSON object is based on parameters indicating the status of resources of the mobile computing device.

Mobile computing device 105 can receive (215), from the server computing device, a response including a data object file retrieved from the computer data store. For example, mobile computing device 105 can receive a response from server computing device 110 including a JSON object that server computing device 110 retrieved from database 115.

As discussed above, the learning subsystem can use analytics to make predictions on the application and features a particular device user likely desires to use during an impending network outage based on parameters such as time of day and day of the week. Accordingly, in some embodiments, the data object file included in the response from server computing device 110 depends on one or more of the date, the time of day, and data indicating a geographic location of the mobile computing device 105 when the request was sent. In some embodiments, the data object file included in the response from server computing device 110 is further based on a predictive algorithm for determining a feature of an application that will be used during a network outage experienced by mobile computing device 105.

Upon receipt of the data object file, mobile computing device 105 automatically invokes (220) a network bot, a user interface bot, and a navigation bot. For example, the bot framework automatically gets initiated upon receipt of the JSON object during the period of safe seconds. Inside this framework there are three core components: the network bot, the UI bot and the navigator bot.

The network bot can retrieve (225) application data from a web server based upon a network object extracted from the data object file. For example, the network bot is responsible for extracting the network object from the JSON file and making the necessary calls with the respective payloads and headers. In parallel the UI bot extracts the UI object from the JSON file and keeps the basic structure for the UI ready.

The navigation bot can generate (230) a navigation handle corresponding to a utilized feature of an application executing on mobile computing device 105 during a network outage, wherein the navigation handle is based upon a navigation object extracted from the data object file. Accordingly, the navigation bot takes care of the navigation handle which is again extracted from the navigator object in the JSON file. One of the important modules of the navigator bot is the involvement of the cognitive piece, where the input trigger can be through any format or device.

The UI bot can render (235) an application user interface based upon a user interface object extracted from the data object file and the navigation handle. For example, after the data gets returned from the network object, it is sent to the UI bot and to the navigator bot to fill the pending components with the returned values and to also take care of the navigation piece.

The following pseudo code illustrates exemplary computing operations of the bots described above:

```
Var networkobject = extractNetworkObject(feature.json)
Fetch(NetworkObject.URL,NetworkObject.PayLoad,
NetworkObject.ResponseSet).then(response( ){
    Var data = extractUIComponent(response);
    sendResponsetoUIbot(data);
    sendResponsetoNavigatorbot(data);
});
```

The following illustrates exemplary data objects used for invoking the network bot:

```
"networkBot": [
    {
        "url":"<API URL>",
        "headers":[{
            "Accept": "< Type>",
            "Content-Type": "<Type>",
            "charset": "<Type>"
        }],
```

-continued

```
        "credentials": "include",
            "responseType": "JSON"
    },{
    "url": "<API URL>",
    "headers":[{
        "Accept": "<Type>",
        "Content-Type": "<Type>",
        "charset": "UTF-8"
    }],
    "credentials": "include",
    "responseType": "JSON"
    }
],
```

The following illustrates exemplary data objects used for invoking the navigation bot:

```
"navigationBot": [
    {
    "screenname":"Screen Name",
    "screenNumber": 2
    },{
    "screenname":"Screen Name",
    "screenNumber": 2
    }
],
```

The following illustrates exemplary data objects used for invoking the UI bot:

```
"UIBot": [
    {
    "layoutType":"Layout Type",
    "segments":[
        {
            "input":"",
            "layout":"Layout Type",
            "dataLabel":"",
            "dataSpacing":"",
            "dataAlignment":"",
            "style":[{
                "textColor":"#000",
                "textFont":"Times New Roman"
            }],
        }
        ]
    }
]
```

As described above in connection with method 200, server computing device 110 sends mobile computing device 105 a push notification a period of time or "safe seconds" before a predicted network outage. In some embodiments, a scheduler cronjob runs every minute, and invokes a lambda function that takes care of the cloud messaging push notification. In some embodiments, the push notification is a notification message with the data payload being the userId.

The following pseudo code illustrates exemplary computing operations of the lambda function described above:

```
{
    "to": "<User Identified....",
    "content_available": true,
    "mutable_content": true,
    "data":
    {
        "message": "Offline Content",
        "mediaUrl": "<Media URL>"
    }
    "notification":
    {
        "body": "Content Updated",
        "sound": "default"
    }
}
```

In addition to the features described above, space management and cost optimization are critical aspects of the technology described herein. For example, space management is concerned with an important piece of "time to live" component, which handles automatic deletion of each component after getting downloaded to local cache after a period of time, "t" seconds. In some embodiments, "t" second is a period of time that the network connection has remained stable after an outage. Another factor to the space management is selective manner in which the data for the offline application components is downloaded. As one example, if the user typically accesses only the first 3 links out of 7 total links on a particular page, the bot framework downloads only the first 3 links to efficiently manage the space. In some embodiments, space management features of the technology cause the bots to download the lower quality/resolution multimedia files (images, gifs, video, etc.). This can advantageously result in more content being downloaded for use during an outage, albeit at a lower resolution.

In some embodiments of the space management features described above, parameters are sent from mobile computing device 105 as part of the request after receiving the cloud messaging (e.g., push) notification. In some embodiments, parameters indicative of mobile computing device 105's battery charge level and free storage space are sent in the request. These can be critical parameters for determining the amount and quality of data server computing device 110 sends back in the JSON object file.

The following pseudo code illustrates exemplary computing operations of the space management function described above:

```
Var deviceBattery = Device.getBatteryLevel ( );
Var deviceFreeSpace = Device.getFreeDiskStorage( );
Var responseBotJson = http.get("URL/uid=xxx&dbattery=device_battery&
device_freeSpace=device_freeSpace');
```

Function to execute:

```
Function(event,params){
    Var batteryDetails = event["queryStringParameters"]["device_battery]
    Var diskFreeSpace = event["queryStringParameters"]["deviceFreeSpace"]
    if (batteryDetails >= 20 && diskFreeSpace >= 524288000){
        getFunctionDetails(limit=None)
}
```

```
Else if (batteryDetails >= 20 && diskFreeSpace < 524288000){
    getFunctionDetails(limit=3)
}
Else if (batteryDetails < 20 && diskFreeSpace < 104875600){
    getFunctionDetails(limit=1)
}
}
** diskFreeSpace is measure in bytes
```

Once the offline push notification is received, the API calls are made to trigger the bots where the response is the JSON object with Navigation, Network and UI objects.

Cost optimization is an algorithm that learns to get data in its cheapest form. For example, cost optimization may dictate that data is downloaded only when free Wi-Fi is available as opposed to metered Wi-Fi as in airports and bus/train stations. Further cost optimizations can be made between using home Wi-Fi versus using public Wi-Fi, and using cellular data versus cellular roaming data. Using cost optimization, priority is given to the approach that costs the least, based on a hierarchy of what connections are available for obtaining data.

Figure 3:
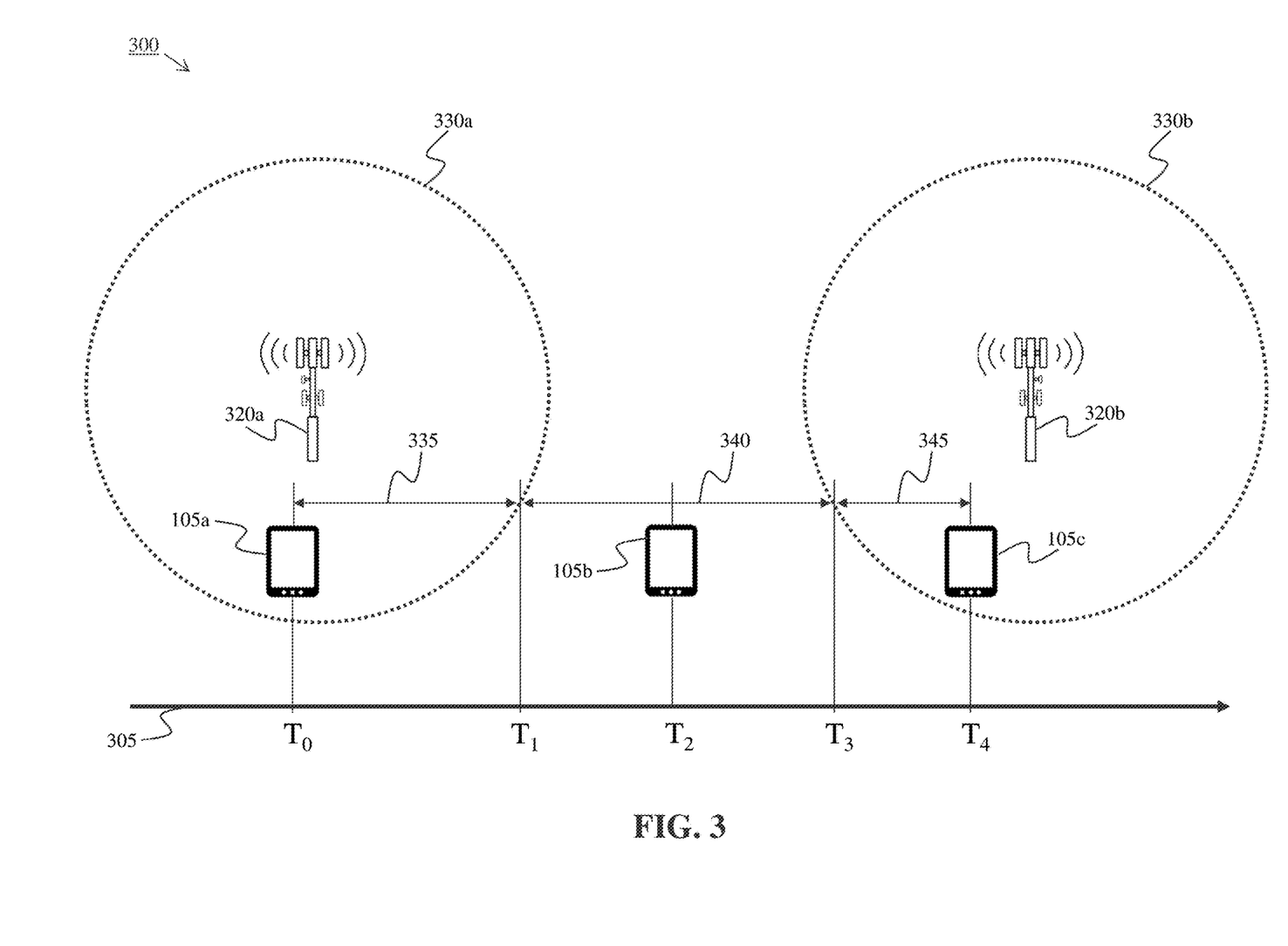
FIG. 3 is a diagram illustrating exemplary operations of a system and method for automating retrieval of application data prior to a network outage and rendering a user interface on a mobile computing device experiencing a network outage, according to embodiments of the technology described herein.

FIG. 3 is a diagram 300 illustrating exemplary operations of the systems and methods described herein for automating retrieval of application data prior to a network outage and rendering a user interface on a mobile computing device experiencing a network outage. Diagram 300 includes cellular tower 320a having a network coverage area denoted by 330a, and cellular tower 320b having a network coverage area denoted by 330b. Diagram 300 further includes a timeline 305 with markers for five different instances in time, $T_0$-T4. Diagram 300 also shows mobile computing device 105 at three of those instances in time: $T_0$ denoted by mobile computing device 105a, $T_2$ denoted by mobile computing device 105b, and $T_4$ denoted by mobile computing device 105c. Timeline 305 and its related markers help illustrate the operations of the systems and methods described herein as mobile computing device 105 moves from an area in which it has network coverage (e.g., coverage area 330a) between markers $T_0$ and $T_1$, to an area in which mobile computing device 105 experiences a network drop or outage between markers $T_1$ and $T_3$, and finally moves to an area in which it reacquires a network signal (e.g., coverages area 330b) at $T_3$ and beyond.

At marker $T_0$, mobile device 105a is still within coverage area 330a, but it nonetheless receives (FIG. 2, 205) a push notification from server computing device 110 based on analytics run by the learning subsystem. In particular, the push notification is sent a period of time (e.g., $T_1$ minus $T_0$) before mobile computing device 105a leaves coverage area 330a. This time period corresponds to the safe seconds discussed herein, and is denoted as 335 in FIG. 3. Accordingly, during this time, the bots are triggered and make the network calls, create the UI components and set the navigation in place, such that when the user opens the app on mobile computing device 105 after marker $T_1$, the data needed to support the features the user wishes to use when offline has all been fetched before the network outage occurs The area between markers $T_1$ and $T_3$, is a network dead spot or dead zone denoted by 340. For mobile computing device 105b shown at marker $T_2$, the bots have been triggered, have gathered navigation and UI data, and have rendered the application desired to be used by the user based on predictive analytics by the learning subsystem. Accordingly, as mobile computing device 105b travels through the dead zone 340, the user retains full use of the features of his preferred applications.

At marker $T_3$, mobile device 105 enters coverage area 330b and regains full network access. As described above, after a period of "t" seconds, denoted in FIG. 3 as 345, when mobile device 105c has reached marker $T_4$, space management algorithms of the technology handle automatic deletion of the data that had been downloaded to local cache.

Accordingly, the systems and methods described herein provide a smart offlining algorithm for tracking, learning, and predicting logical and physical patterns of application use based on data gathered up to and after the application experiences a network drop, or goes offline completely. Saving data for the right metrics up to and when the app goes offline allows the technology to understand the application's network pattern, and when to trigger the bots that keep the data ready before the app goes offline.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile computing device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile computing device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

Variations, modifications, and other implementations of what is described herein will occur to those of ordinary skill in the art without departing from the spirit and the scope of the invention. Accordingly, the invention is not to be limited only to the preceding illustrative descriptions.

What is claimed is:

1. A system for automating retrieval of application data prior to a network outage and rendering a user interface on a mobile computing device experiencing a network outage, the system comprising:

a computer data store including a corpus of data object files comprising a plurality of data objects corresponding to features of one or more applications executable on the mobile computing device;

a server computing device in communication with the computer data store;

the mobile computing device in communication with the server computing device via a wireless network, the mobile computing device having a memory for storing computer-executable instructions and a processor that executes the computer-executable instructions to:

receive, from the server computing device, a push notification a period of time before a predicted network outage experienced by the mobile computing device, wherein the period of time before the predicted network outage is based on a current speed of the mobile computing device and historical application usage data comprising indicia of a geographic location of the mobile computing device captured during a previous network outage experienced by the mobile computing device;

send, to the server computing device, a data object file request comprising parameters indicating a status of resources of the mobile computing device;

receive, from the server computing device, a response including a data object file retrieved from the computer data store, wherein at least one of an amount of data in the data object file of the response or a quality of data in the data object file of the response is based upon the status of resources of the mobile computing device;

automatically invoke, on the mobile computing device, a network bot, a user interface bot, and a navigation bot upon receipt of the data object file;

retrieve, by the network bot, application data from a web server based upon a network object extracted from the data object file;

generate, by the navigation bot, a navigation handle corresponding to a utilized feature of an application executing on the mobile computing device during a network outage, wherein the navigation handle is based upon a navigation object extracted from the data object file;

render, by the user interface bot, an application user interface based upon a user interface object extracted from the data object file and the navigation handle.

2. The system of claim 1 wherein the data object file request comprises parameters indicating a charge level of a battery of the mobile computing device and an amount of free space remaining in a data storage component of the mobile computing device.

3. The system of claim 1 wherein the number of data objects in the data object file is based on the parameters indicating the status of resources of the mobile computing device.

4. The system of claim 1 wherein the period of time before the predicted network outage experienced by the mobile computing device is based on a first duration of time required for the network bot to retrieve the application data from the web server and a second duration of time required to render the application user interface.

5. The system of claim 1 wherein the historical application usage data comprises one or more of a date and a time of day.

6. The system of claim 1 wherein the historical application usage data comprises one or more of an application type, and application name, and a feature of an application being utilized at the time of a network outage.

7. The system of claim 1 wherein the data object file included in the response from the server computing device depends on one or more of a date, a time of day, and data indicating a geographic location of the mobile computing device.

8. The system of claim 7 wherein the data object file included in the response from the server computing device is further based on a predictive algorithm for determining a feature of an application that will be used during a network outage experienced by the mobile computing device.

9. The system of claim 1 wherein the network bot retrieves a subset of the application data based on one or more of a charge level of a battery of the mobile computing device, an amount of free space remaining in a data storage component of the mobile computing device, and the duration of the period of time before the predicted network outage experienced by the mobile computing device.

10. The system of claim 1 wherein the period of time before the predicted network outage is further based on a direction of movement of the mobile computing device.

11. The system of claim 1 wherein the mobile computing device automatically deletes at least a portion of the application data retrieved by the network bot after a predetermined period of time.

12. The system of claim 11 wherein the predetermined period of time is based a period of time that a network connection of the mobile computing device remains stable once the network outage ends.

* * * * *